(12) United States Patent
Vereecken et al.

(10) Patent No.: US 6,321,839 B1
(45) Date of Patent: *Nov. 27, 2001

(54) METHOD OF AND PROBE FOR SUBSURFACE EXPLORATION

(75) Inventors: Harry Vereecken, Jülich; Jürgen Höltenmeier, Niederzier; Uwe Hashagen, Aachen, all of (DE)

(73) Assignee: Forschungszentrum Julich GmbH, Julich (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/379,202

(22) Filed: Aug. 20, 1999

(30) Foreign Application Priority Data

Aug. 21, 1998 (DE) .............................. 198 38 085

(51) Int. Cl.$^7$ ...................................... G01V 5/00
(52) U.S. Cl. .................... 166/250.16; 260/254
(58) Field of Search ................ 166/252.6, 250.16, 166/248; 385/147; 250/254, 255, 256

(56) References Cited

U.S. PATENT DOCUMENTS

| | | | | |
|---|---|---|---|---|
| 4,609,821 | * | 9/1986 | Summers | 250/255 |
| 5,128,882 | * | 7/1992 | Cooper et al. | 364/550 |
| 5,316,950 | * | 5/1994 | Apitz et al. | 436/28 |
| 5,759,859 | * | 6/1998 | Sausa | 436/106 |
| 5,902,939 | * | 5/1999 | Ballard et al. | 73/863.12 |

* cited by examiner

*Primary Examiner*—William Neuder
(74) *Attorney, Agent, or Firm*—Herbert Dubno

(57) ABSTRACT

A method and probe for detecting the concentration of a substance in a measurement region in a subsurface exploration wherein the electromagnetic energy is delivered to this region and picked up from this region via an optical fiber and the measurement is taken or the electromagnetic energy is supplied at a number of locations within the region.

22 Claims, 1 Drawing Sheet

METHOD OF AND PROBE FOR SUBSURFACE EXPLORATION

FIELD OF THE INVENTION

Our present invention relates to a method of subsurface exploration in which a probe is introduced into a borehole or well and, at a measuring region below the surface of the ground, the concentration of at least one material is measured. The invention also relates to a probe for carrying out the method, i.e. for detecting the concentration of at least one substance at a region below the surface of the ground and utilizing the coupling of electromagnetic radiation or energy to the measurement region and/or the coupling of electromagnetic energy out of the measurement region.

BACKGROUND OF THE INVENTION

The coupling of electromagnetic energy into and out of a subsurface region in which the concentration of a substance is to be measured, is described in principle in the commonly owned copending application Ser. No. 09/333,349 filed Jun. 15, 1999 and based upon German Application 19826265, which is hereby incorporated in its entirety by reference.

The substance which can have its concentration measured by this method can be a substance already in the ground, namely, a natural substance, or it can be a substance artificially present at the measurement location, e.g. because it is intentionally introduced like a marker substance or tracer substance, or because it is a contaminant which, for example, can leach from a waste disposal site or dump.

A method of subsurface exploration in which a marker substance is introduced at at least one location in the ground and in which the migration of that substance is measured has been described in the publication "Development of a Single Borehole Process for the Measurement of Horizontal Ground Water Flow" (translated title) by M. Schöttler. In this article, a probe which can be introduced into a borehole or well for carrying out the process is described. The probe can comprise a measurement cell which contains two light sources, a lens system and a special video camera. The marker substance can be a fluorescent material which is introduced centrally over an observation range of several millimeters in size and on which the camera is focused. This region lies axially centrally of the measurement range at a location in which the ground water flow passes freely.

The light sources emit light and the marker substance re-emits light shifted in wavelength from the original emitted light and registered by the video camera as illuminated image points. The result is a high contrast point image which is picked up by video techniques and enables the flow direction of the marker substance to be ascertained.

In another probe for insertion into a borehole or well, marketed by GSF Munich, Germany, the movement of a radioactive marker substance can be detected. This system, however, requires the use of short-lived isotopes which must be prepared by irradiation in a nuclear reactor. The process is relatively expensive and, since the marker substances have short lives, the marker substances can be stored only for limited periods of time. As a consequence, carrying out this latter process is problematical.

A probe for lowering into a well for subsurface exploration has also been developed by the University of California and enables sampling of the ground water to be effected, the sample volumes being pumped to the surface. This system does not permit in-situ measurements of concentration or the like.

Finally, mention can be made of a probe developed by the Technical University of Freiberg, Germany which operates utilizing heat pulses. This system can only be used to detect high ground water velocity.

OBJECTS OF THE INVENTION

It is, therefore, the principal object of the present invention to provide an improved method of subsurface exploration which can be carried out in a simple and economical manner and enables the flow direction of a substance and its concentration to be detected without the drawbacks of some of the methods previously described.

It is a further object of this invention to extend the principles set forth in the copending application mentioned above to improve the versatility thereof.

It is also an object of the invention to provide an improved probe, which can be lowered into a well or borehole and which can provide in a cost effective and simple manner, an indication of the concentration of a substance in a measurement reaching below the ground, details with respect to flow direction and the like.

SUMMARY OF THE INVENTION

These objects and others which will become apparent hereinafter are attained, in accordance with the invention, in a method whereby electromagnetic radiation is coupled into the measurement region at various locations and/or electromagnetic energy is coupled out of the measurement region at various locations and from the electromagnetic energy carried out of the region, a measurement can be made as to a substance at this region.

More particularly, a subsurface exploration method according to the invention can comprise the steps of
  (a) introducing a probe into a borehole in the ground to a subsurface region to be investigated;
  (b) coupling electromagnetic energy into the region to induce emission of electromagnetic radiation from at least one substance in the region;
  (c) coupling electromagnetic energy of the electromagnetic radiation emitted by the substance out of the region, at least one of the steps of coupling electromagnetic energy into the region and of coupling electromagnetic energy out of the region being effected at a plurality of locations in the region; and
  (d) determining a concentration of the substance from the electromagnetic energy coupled out of the region.

The apparatus for subsurface exploration according to the invention can comprise:
  a probe adapted to be introduced into a borehole in the ground to a subsurface region to be investigated;
  means in the probe a probe adapted to be introduced into a borehole in the ground to a subsurface region to be investigated;
  means for coupling electromagnetic energy into the region to induce emission of electromagnetic radiation from at least one substance in the region;
  means for coupling electromagnetic energy of the electromagnetic radiation emitted by the substance out of the region, at least one of the means for coupling electromagnetic energy into the region and out of the region being effective at a plurality of locations in the region; and
  means connected to the means for coupling electromagnetic energy out of the region for determining a concentration of the substance from the electromagnetic energy coupled out of the region.

Advantageously, the electromagnetic radiation includes light rays or a light beam and at least one optical fiber is provided for coupling the light energy into the region and/or for coupling the light energy out of the region. When an optical fiber is provided as the optical waveguide for the light energy, the optical fiber is mounted so that it can be moved, preferably by an electric motor.

It is advantageous, in accordance with the invention, that the electromagnetic radiation be deflected so that, by movement of the deflector, the electromagnetic energy can be brought to or picked up from various locations within the measurement region. The deflection of the electromagnetic energy can be via any type of deflector suitable for the particular electromagnetic energy used. It can, for example, include a mirror or prism or the like or can simply be a bent waveguide such as a bent optical fiber.

Advantageously, the electromagnetic energy is deflected along a predetermined path which can, for example, be a circular path. Advantageously, the electromagnetic energy can be deflected by a rotating deflection means such as a prism, a lens or a mirror.

According to a feature of the invention, the light ray or beam can have an emission wavelength between 200 nm and 950 nm.

It is advantageous further to so carry out the method of the invention that the substance is excited by the light radiation. In this case, the substance can be a luminous substance which is excited to luminescence by absorption of light energy. The emission from the substance can be effected by atomic, molecular or other electromagnetic radiation. The principal excitation for substances in this category is by phosphorescence. However it is also possible to excite the substance to fluorescent. It has been found that in-situ measurement can be taken with a high resolution, especially with respect to measurement of flow with time.

The invention, as has been noted, also comprehends the probe mentioned previously and, preferably, within that probe, an optical fiber is provided for coupling the electrical energy to the measurement region and/or coupling the electromagnetic energy out of the region.

In this probe the optical fiber can be mounted so that it is movable, preferably along a rotary path and is driven, for example, by an electric motor.

To determine the flow direction of nonfluorescing substances it is advantageous to provide means in the probe for introducing a marker substance. Preferably this marker substance is introduced into a lower region of the probe.

The light energy can be generated by a laser which can be provided at the surface and connected via the optical fiber with the measurement region of the probe. This allows a comparatively bulky laser of higher energy to be used. High energy lasers with appropriate emission characteristics, for example, covering the ultraviolet range as well as the visible range, can be used.

Preferably the laser is a pulsed or continuous laser and in the case of a pulsed laser has a pulse duration of approximately 0.5 ns.

It is, however, within the scope of the present invention to provide a very compact laser. In that case the laser can be carried by the probe and connected to the measurement region by the optical fiber. The laser can be a compact semiconductor laser, for example, a laser diode such as a pn diode in which the pn transition forms a pump for the laser. Active materials for the semiconductor can be semiconductors with direct bandgaps. The active region of the laser diode is a thin layer directly in the vicinity of the space charge zone of the pn transition. The laser diode emits coherent radiation with a line width in the range of 1.1 nm and particularly sharp directionality.

Another appropriate light source for incorporation in the probe is a luminescence diode (light emitting diode-LED). The luminescence diode contains a semiconductor material with a p-doped and a n-doped region. In this region surplus charge carriers diffuse into the respective oppositely doped region and recombine there with the charged carrier. The result is an incoherent electromagnetic radiation with a typical line width in the range of several 10nm. The band width here depends upon the choice of semiconductive material and its doping.

For the greatest possible operation between emitted light and the light re-emitted from the material it is advantageous to use a monochromatic light. An especially low band width of preferably less than 10 nm, especially about 0.1 nm, has the advantage that the spectral distribution can be determined with the greatest possible precision. A shift of the wavelength between the emitted and re-emitted light amounts to about 20 nm to about 100 nm. Further, it is advantageous to use a light source which has an emission characteristic which varies with time. With such a time-variable emission characteristic, a modulation of the intensity or of the wavelength of the emitted radiation can be used. With the aid of a CCD camera it is possible to determine a decay characteristic of the excitation.

The use of a light source with a time-variable emission wavelength enables different substances in the ground to be excited to emission and to be separated from one another, i.e. their concentrations and flow characteristics can be independently determined.

One application of the invention is in the in-situ determination of the flow velocity of a liquid, especially ground water.

The invention is, however, in no way limited to this special field of application.

With the aid of the method and/or probe of the invention it is possible to determine a depth profile of a concentration or and/or a flow velocity of a substance.

It is also possible with the method and apparatus of the invention to detect a raw material such as a crude oil.

The method of the invention is, moreover, extremely durable so that it can be used for the long-term determination or monitoring of concentrations and/or flow velocity. It is thus possible utilizing one or more probes in accordance with the invention in the vicinity of or within a selected region of a dump or waste disposal site to determine whether there is and the extent of diffusion of toxic contaminants into or in the ground water.

The method and probe of the invention are also suitable in other applications in which a limited range of concentrations, concentration changes or flow velocity are to be ascertained in a subsurface region. By the spectral analysis of the measurement signal, the intensity of the measured signal is determined as a function of the wavelength. It has been found to be especially advantageous to additionally carry out a calibration measurement on the system with known parameters so that not only can qualitative changes be detected but the intensity of the signal can also provide quantitative values.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
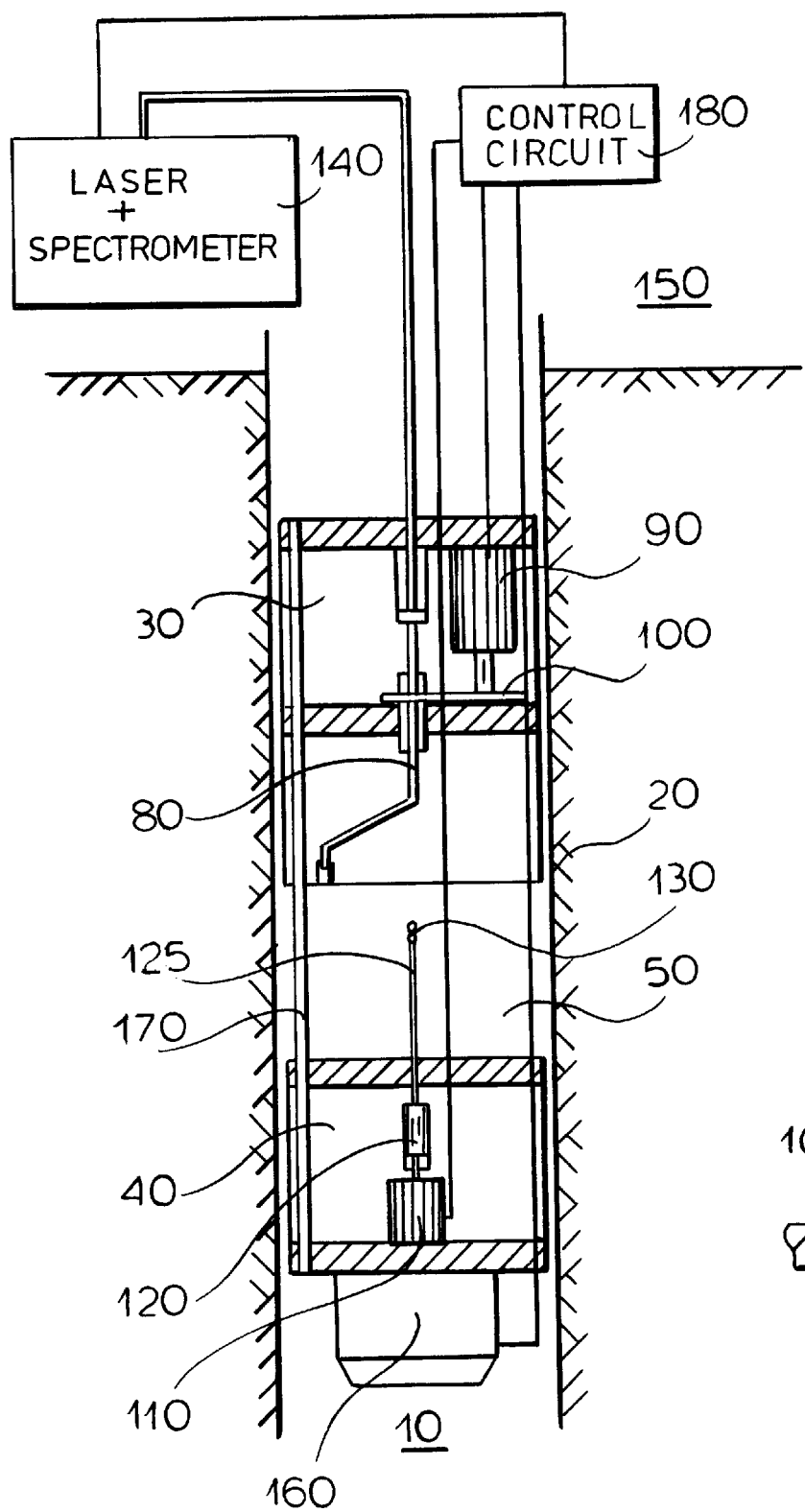
FIG. 1 is a diagrammatic cross section through a borehole or well provided with a probe in accordance with the invention.

FIG. 1 shows, exaggerated as to scale, a horizontally extended vertical section through a borehole or well 1 in the is ground, e.g. at a location at which horizontal ground water flow is to be measured and/or migration of a contaminant within or from a dump or waste disposal site is to be measured, or some other location at which subsurface exploration of a region is to be carried out to determine the concentration of a substance at this region. The probe 20 comprises two packers 30 and 40 which define between them a measurement region 50 which is sealed by the packers upwardly and downwardly.

The upper packer 30 has passages for an optical waveguide, especially an optical fiber 80 which can be a glass fiber cable. The packer 30 also carries a motor 90 which is connected via a transmission 100 with the light conducting fiber 80 so as to rotate the latter around a vertical axis. The light conducting fiber is bent so that the sensing end of the light conducting fiber, at which emitted light is launched into the region 50 and re-emitted light is picked up from the region 50, is swung in a circular arc.

In addition, a coupling 70 can be provided between the rotating optical fiber 80 and a light fiber bundle running to the block 140 which will be described in greater detail.

The motor 90 of the transmission 100 forms a drive means for swinging the optical fiber 80 along the measurement circle. A control circuit 180 controls the motor 90 so that the measurement circle is covered with a predetermined repetition frequency.

In the lower packer 40, a feed device is provided for a marker substance which can be fed to the region 50. The feed device can comprise a motor 110 which can drive a metering cylinder 120 to discharge the marker substance through a one way valve 130 into the region 50. A feed tube 125 connects the valve 130 with the metering cylinder 120. The marker substance can be excited with light from the optical fiber 80 and the light re-emitted by the excited marker substance can be picked up by the optical fiber and carried to the spectrometer which forms part of the circuit 140.

Above the ground 150, the measuring unit 140 is provided and contains, in addition to the spectrometer which responds to the electromagnetic energy coupled out of the region 50, a laser or other monochromatic source for the light launched into the region 50.

The laser can be a dye laser with an emission wavelength between 360 and 990 nm which itself can be excited by a nitrogen laser with an emission wavelength of 337.1 nm. Between the optical fiber 80 and the dye laser, a frequency multiplier (SHG) is arranged. The SHG unit can include a BBO crystal, a reflector and two lenses and can be designed to effect a frequency doubling of the signal of the dye laser and has an output wavelength of preferably 225 nm to 360 nm.

Instead of the illustrated configuration of the laser 140, the laser can be comparatively less bulky and need not be incorporated in the same housing as that containing the spectrometer. The spectrometer and the laser can be connected with the optical fiber 80 by a wide coupling if desired.

Depending upon the construction of the laser system it is possible to vary the exciting light wavelength between 200 nm and 950 nm.

A bypass 170 between the packers 30 and 40, extends through the probe in the vertical direction to permit vertical liquid flow without interference with the transverse flow through the region 50.

The illustrated apparatus, after the probe 20 has been inserted in a borehole or well having a diameter of say 5 centimeters or 2 inches, is used as follows:

the probe 20 is lowered to the desired aquifer depth and is there fixed in a filter region of the borehole 10. The packers 30 and 40 isolate a measuring range 50 in the borehole and so seal the latter that only horizontal flow through this region is permitted.

The bypass 170 permits vertical flow between the regions above and below the packers without influencing the horizontal flow to be measured.

The optical fiber 80 also conducts the re-emitted optical energy to the spectrometer of the unit 140. As soon as the marker material reaches a point in the measurement circle described by the rotating optical fiber 80 at which a re-emitted signal is detected, the re-emitted signal is conducted by the optical fiber 80 to the measuring unit 140 and there is evaluated as a substance-specific spectral signal. From the position of the signal in the measurement circle and the timing pattern of detection of this signal, the flow direction and the flow velocity of the ground water are determined.

For a precise geographic orientation of the probe with respect to the hole 20, the probe carries a compass 160 whose output is supplied to the control circuit 180 which is connected to the circuit 140 previously described. The compass has the advantage that it can function at a significant geological depth. Instead of the compass or in addition thereto, a GPS sensor can be provided.

A suitable measurement can be obtained with the liberation of the marker substance which can be uranin, i.e. sodium fluorescein, via the feed line 125 and the valve 130 from the metering cylinder 120 into the measurement region 50. The metering system is so formed that the injection of the marker substance is effected centrally of the borehole. Uranin is a dye stuff which is not radioactive, its name aside, but rather is a derivative of a carboxylic acid. The uranin exists in various states depending upon the pH value of a solution thereof, and hence the pH at which the uranin is found. The uranin can be detected in very small concentrations, for example, as low as 0.002 μg/l by its fluorescence. The fluorescence yield and hence the intensity of the fluorescence is unusually high and is a function of the concentration. Apart from its low detection concentration, uranin has the further advantage that its calibration curve is substantially linear over five orders of magnitude of the concentration, i.e. five concentration ranges. Only at extremely high concentrations above 10,000 μg/l does the intrinsic absorption at dissociation characteristics of the marker result in a decrease in the fluorescence intensity.

The concentration of the marker detected in the measurement region 50 is a function of the ground water flow through this region. The substance is excited by the laser light delivered by the optical fiber 80 through the measuremant region and the re-emitted light is conducted by the laser to the circuit 140.

The illustrated embodiment is directed to a single bore process or the measurement of horizontal ground water flow but the invention is not limited to this application. It may be used to determine the concentration of fluorescent substances already in the ground and for the multibore measurement of flow characteristics, contamination and material concentrations.

The probe can be provided with additional sensors or elements capable of broadening the functioning characteristics of the probe and it is common, for example, to equip such a probe with sensors for the pH value, the electrical conductivity, the temperature, or for the concentrations of various chemical components, for example, oxygen concentration, in the ground water or the subterranium strata at which the measurement is taken. The probe can thus be a multiparameter probe.

The probe can also be used to measure conditions close to the surface of the ground and even at great depths.

The term "ground" is used here in a general sense and encompasses not only the ground in a geological sense but all components of the earth in which a probe of the type described can be provided. The invention also includes the monitoring or detection of environmental contaminants or potentially contaminating substances at a dump or waste disposal site. In that case the disposal site is provided with at least one borehole and probe within the disposal site or in the neighborhood thereof. The term disposal site is here used not only to refer to a garbage dump but to any location at which contaminants may accumulate. It can refer to highways or the like at which runoffs may cause accumulations of contaminants or migration of contaminants into or within ground water.

Figure 2:
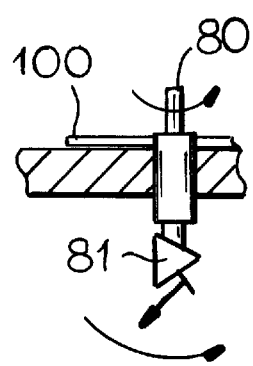
FIG. 2 is a detail section showing another aspect of the invention.

In FIG. 2 of the drawing, we have shown an embodiment in which the laser 80 is equipped with a prism 81 for deflecting the outgoing light beam or picking up an incoming re-emitted radiation and which, upon rotation via the transmission 100 of this prism will cause the deflection beam to sweep in a circle.

We claim:

1. A subsurface exploration method comprising the steps of:
   (a) introducing a probe into a borehole in the ground to a subsurface region within said borehole to be investigated;
   (b) coupling electromagnetic energy into said region to induce emission of electromagnetic radiation from at least one substance in said region;
   (c) coupling electromagnetic energy of the electromagnetic radiation emitted by said substance out of said region, at least one of the steps of coupling electromagnetic energy into said region and of coupling electromagnetic energy out of said region being effected at a plurality of locations within said borehole in said region;
   (d) determining a concentration of said substance from the electromagnetic energy coupled out of said region; and
   (e) determining a location from said plurality of locations within said boreholes at which a detected concentration of said substance occurs.

2. The method defined in claim 1 wherein electromagnetic energy is light and the light is passed through an optical fiber.

3. The method defined in claim 2, further comprising the step of moving said optical fiber in said region between said locations in said borehole.

4. The method defined in claim 3 wherein the optical fiber is moved in said region between said locations in said borehole by driving said optical fiber with a motor.

5. The method defined in claim 1 wherein the electromagnetic energy is deflected.

6. The method defined in claim 5 wherein the electromagnetic energy is deflected along a predetermined path in said region within said borehole.

7. The method defined in claim 6 wherein said electromagnetic energy is deflected along a circular path in said region in said borehole.

8. The method defined in claim 6 wherein the electromagnetic energy is deflected by rotating an electromagnetic energy deflector.

9. The method defined in claim 1 wherein the electromagnetic energy contains a light beam.

10. The method defined in claim 9 wherein said light beam has a wavelength between 200 nm and 950 nm.

11. The method defined in claim 10 wherein said light beam is generated by a laser.

12. The method defined in claim 10 wherein said substance is excited by said light beam.

13. The method defined in claim 1 wherein said substance is a marker introduced into the ground.

14. The method defined in claim 1 wherein said substance is a toxic substance.

15. The method defined in claim 1 for detecting the presence in the ground of a raw material.

16. A subsurface exploration apparatus comprising:
   a probe adapted to be introduced into a borehole in the ground to a subsurface region within said borehole to be investigated;
   means in said probe adapted to be introduced into a borehole in the ground to a subsurface region to be investigated;
   means for coupling electromagnetic energy into said region to induce emission of electromagnetic radiation from at least one substance in said region within said borehole;
   means for coupling electromagnetic energy of the electromagnetic radiation emitted by said substance out of said region within said borehole, at least one of the means for coupling electromagnetic energy into said region and out of said region being effective at a plurality of locations in said borehole in said region;
   means connected to the means for coupling electromagnetic energy out of said region for determining a concentration of said substance from the electromagnetic energy coupled out of said region, and
   a device for determining a location from said plurality of locations within said borehole at which a detected concentration of said substance occurs.

17. The apparatus defined in claim 16 wherein said one of said means for coupling includes an optical fiber.

18. The apparatus defined in claim 17, further comprising means for mounting said optical fiber for movement in said region within said borehole.

19. The apparatus defined in claim 18, further comprising a motor for driving said optical fiber.

20. The apparatus defined in claim 16 wherein said one of said means includes means for deflecting said electromagnetic energy.

21. The apparatus defined in claim 20 wherein said means for deflecting includes a rotatable member.

22. The apparatus defined in claim 16 wherein both of said means for coupling include optical fibers.

* * * * *